[54] MEAT PACKAGE

[75] Inventors: Paul E. Grindrod; Robert L. Goller; Oscar E. Seiferth, all of Madison, Wis.

[73] Assignee: Oscar Mayer & Company Inc., Chicago, Ill.

[22] Filed: April 15, 1970

[21] Appl. No.: 28,591

[52] U.S. Cl. ............... 99/174, 99/171 M, 156/247, 264/95, 99/171 LP
[51] Int. Cl. ............................................. B65b 25/06
[58] Field of Search ...99/174, 171 LP, 171 S, 171 C, 99/171 OM; 156/247, 242; 53/14, 252, 254; 264/95

[56] References Cited

UNITED STATES PATENTS

| | | | |
|---|---|---|---|
| 3,131,069 | 4/1964 | Goller | 99/171 X |
| 3,202,271 | 8/1965 | Kink | 99/171 S |
| 3,491,935 | 1/1970 | Trotten | 99/171 UX |
| 3,574,642 | 4/1971 | Weinke | 99/174 |
| 3,647,485 | 3/1972 | Seifeith et al. | 99/174 |
| 3,223,761 | 12/1965 | Raley | 264/95 UX |
| 3,490,971 | 1/1970 | Wolten | 156/247 X |
| 3,620,860 | 11/1971 | Eckhardt | 156/247 |

OTHER PUBLICATIONS

Tickenal Def. Pup. of Ser. No. 742,410 filed 7/3/68 published in 861 0.6.1021 on 4/22/69, Defensive Publication, T 861046

*Primary Examiner*—Frank W. Lutter
*Assistant Examiner*—Robert Halper
*Attorney*—Greist, Lockwood, Greenawalt & Dewey

[57] ABSTRACT

A fresh meat package in which an outer oxygen impermeable lamina is readily and entirely peelable from an inner oxygen-permeable lamina. The package includes means for initiating the peeling separation along an edge of the package. The package, and method for manufacturing of same, is directed to the central packaging of fresh or fresh-frozen meats. Outer oxygen barrier maintains meats in well preserved condition in spite of purplish color having low consumer appeal. Shortly prior to display for sale to the consumer outer lamina is removed by the retailer and product develops healthy bright red "bloom" due to high oxygen through-put of inner remaining film package.

9 Claims, 4 Drawing Figures

PATENTED JAN 30 1973
3,713,849
SHEET 1 OF 2
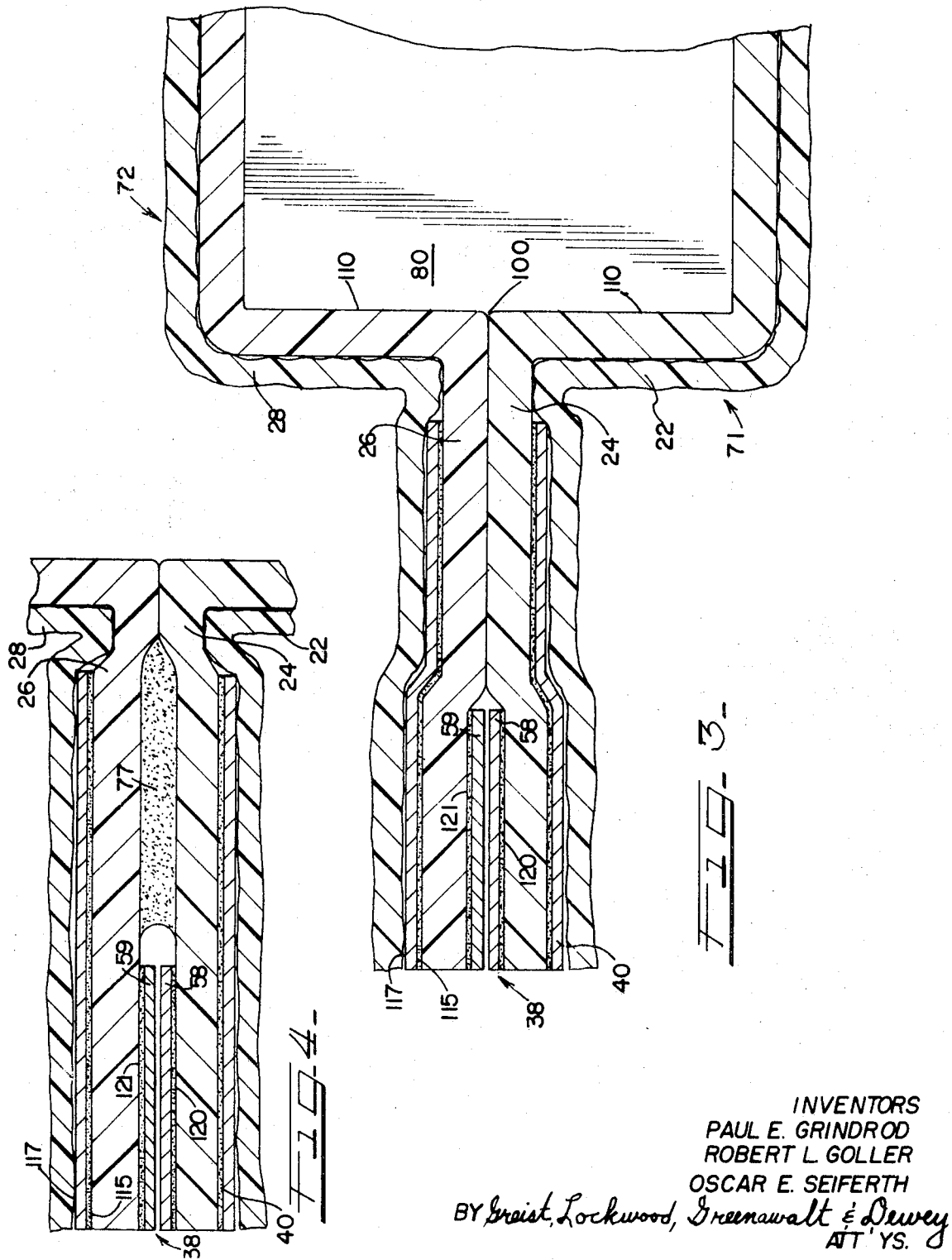
INVENTORS
PAUL E. GRINDROD
ROBERT L. GOLLER
OSCAR E. SEIFERTH
BY Greist, Lockwood, Greenawalt & Dewey
ATT'YS.

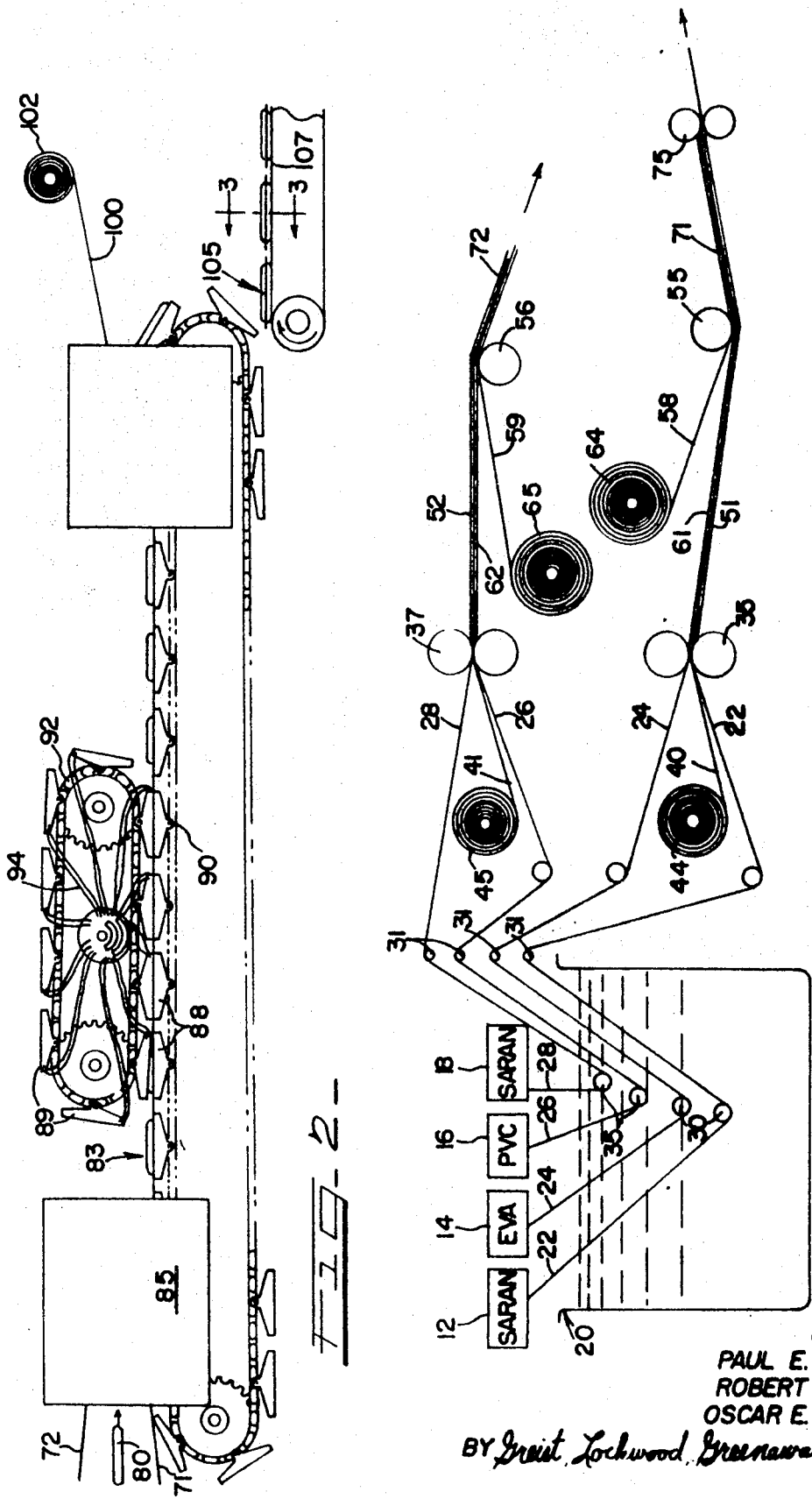

MEAT PACKAGE

The short shelf-life of fresh meat has deterred centralized packaging of this commodity. Fresh meat held in a hermetically sealed oxygen barrier remains purple colored. This color is characteristic of the reduced form of the meat pigment myoglobin. Meat which is permitted access to oxygen, either through permeable packaging material or by direct exposure to air, develops a bright red color or "bloom". This color is characteristic of the oxygenated form of meat pigment called oxymyoglobin.

However, as oxygen is permitted to combine with or oxygenate the meat pigment to form a bright red color, the oxygen also becomes available to convert the myoglobin meat pigment irreversibly to a brown or gray metmyoglobin. The latter irreversible reaction leads to the development of the brown and gray pigments which render fresh meat unacceptable to the average consumer. Marketing of centrally packaged fresh meat has met with considerable difficulty because of such factors as those just described.

Four different approaches to fresh meat packaging have been attempted. First, fresh meat has been packaged in high oxygen barrier film such as saran. This meat remains purple, and while its quality probably surpasses that of any other fresh meat, the purple color has prevented the acceptance of this product. Secondly, fresh meat has been packaged in suitable cellophane and polyethylene materials which permit the meat to bloom to a bright red color. However, the color life of this package-product combination is limited to about three days. After this period of time oxidative changes occur and the meat becomes brown or gray.

This has limited the merchandising of fresh meat to instore packaging. Third, meat has been packaged in a permeable cellulose or polyethylene wrap and overpacked in an oxygen impervious enclosure in an atmosphere of pure oxygen. This has provided an unusually bright red appearance which almost doubles the color life of the meat. The packages are removed from the oxygen-rich overpack at the point of sale in the bright red color persists about six days instead of three. This apparently anomalous system of packaging fresh meats has been explained as follows: the presence of an oxygen-rich atmosphere favors the oxygenation reaction resulting in a bright color and, strangely enough, minimizes the oxidation reaction which results in an irreversible brown or gray color. Air atmospheres, or any oxygen-containing atmospheres containing low levels of oxygen favor the oxygen reactions which result in brown or gray colors and minimize the oxygenation reaction resulting in the reversible bright red color. A fourth system has also been attempted, namely, centrally packaging fresh meat with an oxygen-permeable wrap, and then placing the thus wrapped package in a second container which is drawn tightly around the first, the second container being of the oxygen-barrier type.

In a meat packaging and distribution system involving a central packaging operation and widely dispersed retail operations, the time lapse between central packaging and retail sale may be in the order of a fortnight. The reason the first approach does not lend itself to central packaging has been explained above, and the color-life of the product-package in accordance with the second approach is inadequate to permit central packaging. The third approach involves the obvious disadvantage of requiring the centrally located packager to work in and with dangerous oxygen-atmospheres, and moreover this method merely extends the color-life to about a week.

The fourth method as proposed requires a large number of separate operating steps and moreover requires a relatively large capital investment, i.e., separate vacuum forming equipment for the underwrap and also for the oxygen-barrier overwrap.

It is an object of this invention to provide a package and method for packaging which permits fresh or fresh-frozen meats to be centrally packaged, which method and package is readily adaptable to equipment presently widely available and presently being employed in the manufacture of vacuum packed laminated packaged meats.

Other objects not specifically set forth above will become apparent from the following detailed description made in conjunction with the drawings, wherein:

FIG. 1 is an elevational schematic view showing the formation of the upper and lower webs, or laminations which are used in making a preferred fresh meat-package product in accordance with this invention;

FIG. 2 is a schematic elevational view showing the steps in the manufacture of a package-product;

FIG. 3 is a greatly enlarged schematic elevational cross-sectional view of an entry port of a package of this invention taken approximately through the line 3—3 of FIG. 2; and FIG. 4 is an enlarged schematic elevational cross-sectional view of the entry port region of a package as in FIG. 3, showing an alternative entry port seal.

As illustrated in FIG. 1, four extruders, schematically illustrated as saran die 12, ethylene vinyl acetate copolymer die 14, polyvinyl-chloride die 16, and saran die 18. The representation at 12, 14, 16 and 18 is intended to represent schematically the supply hoppers, extruders, dies, etc. of the known types which conventionally are used to extrude thin packaging films. Films 22, 24, 26, 28 emitting from the respective dies pass into a water cooling tank generally represented at 20. Films 22, 24, 26, 28, pass under water cooling tank rollers 30 and then over guide rollers 31 and are then passed between respective laminating rollers. Lower film pair 22, 24, consisting of lowermost film 22 of saran, and film 24 of ethylene-vinyl acetate copolymer (hereinafter EVA) are fed between laminating rollers 35. Upper pair 28, 26 comprising outermost film 28 or lamina of saran, and lower film 26 of polyvinyl chloride (PVC, hereinafter) are fed between laminating rollers 37. Along the portions of the respective films 22, 24, 26, 28 which will eventually be an outer package edge, generally indicated at 38, in FIG. 3, respective first coated paper strips 40, 41 are fed between respective film laminae 22, 24, and 26, 28. First coated paper strips 40, 41 are fed continuously from supply rolls 44, 45 which are maintained under very slight tension in order to keep strips 40, 41 taut. The resulting lower and upper laminations 51, 52 are then passed under and over rollers 55, and 56, respectively, whereat second narrow paper strips 58, 59 are applied to "inner" faces 61, 62 respectively of lamination 51, 52. Strips 58, 59 are continuously fed from rolls 64, 65 which are also maintained under slight tension in order to keep the second paper label stock strips 58, 59 feeding evenly. Downstream of rollers 55, 56 lower film web 71 comprises outermost lamina of saran, and inner lamina of EVA copolymer and paper label therebetween at that portion of the lamination which will eventually be edge 38, with paper opening tab 58 adjacent thereto on inner face 61 also at region 38. Downstream of roller 56, lamination 72 comprises outer lamina 28 of saran and inner PVC layer 26 with opening tab stock 41 therebetween in the portion of the lamination which will eventually be package edge 38. Inner face 62 of the lamination has attached thereto paper label stock 59 in the same region. Downstream of roller 55, optional hot melt coater means (not shown) can apply an optional hot melt adhesive bead 77 (FIG. 3).

Webs 71, 72 are now ready for use in the continuous packaging of meat products in equipment of known type as schematically illustrated in FIG. 2.

A fresh meat product 80 is fed by known means (e.g., see U.S. Pat. No. 3,083,106, the disclosure of which is incorporated herein by reference) between webs 71, 72, and in conventional equipment of known type, webs 71, 72 are drawn tightly and completely around product 80 and sealed together, the seal completely surrounding product 80. A continuous product-containing lamination 83 leaves package forming unit 85. This continuous lamination has individual articles of product 80 enclosed therebetween at regular intervals. The positioning and/or spacing of product 80 within continuous lamination 83 is at predetermined intervals which coincide with the relative positioning of lower and upper indexed product enclosing means 88, 89 respectively. In the embodiment illustrated in FIG. 2, lower product-enclosing means 88 are spaced apart on an endless conveyor 90 and upper product-enclosing means 89 are spaced apart on endless conveyor 92. These conveyors 90, 92 are driven and indexed by known means which do not constitute part of the inventive concept.

Upper product-enclosing means 89 are provided with heating means 94 which supply steam or hot water in a known manner to enclosing means 89. Thus the product-package units are warmed for a short period of time to assist in the initiation of the crystallization of the saran, and to adjust the tenacity of the bond between outer saran films 22, 28 and their respective adjacent inner films 24, 26. After the relatively short warming step, product web 83 passes through a trimming unit of known type schematically illustrated by box 98. Perforated lamination web 100 from which product is cut out is finally wound around roll 102, and separate integral product-packages 105 are discharged from lower product conveyor-enclosure 88 onto conveyor 107, which is also driven by known means.

As illustrated in FIG. 3, final products 105 comprise fresh or fresh-frozen meat article 80, tightly enclosed within upper lamination 72 and lower lamination 71 which extend around sides 110 of article 80 with inner faces 61, 62 of inner laminae 24, 26 respectively in abutting relationship. In the region enclosing article 80, lamination 72 comprises outermost oxygen barrier saran film 28 and innermost high-oxygen through-put PVC film, in the illustrated embodiment. In the region immediately adjacent to article 80, lower lamination 71 comprises outermost saran film 22 and innermost high-oxygen through-put EVA film 24.

In the preferred illustrated embodiment, the peelable bond between saran film 22 and ethylene vinyl acetate film 24 is very moderate. The tenacity can be controlled or varied by adjusting the level (%) of the vinyl acetate in film 24 within a range which will maintain package integrity throughout the contemplated merchandising cycle, yet permit easy peeling of the saran from the package by the retailer.

Paper tab 41 is laminated between the saran film 28 and the film 26 with the adhesive side 115 of the label strip 41 against the PVC film 26. The outer or opposite side 117 of coated paper strip 41 is silicone treated, for example, to provide almost zero peel strength between saran film 28 and paper label 41. This permits very easy grasping for initiation of peeling of the saran from the package. Beneath the PVC film 26 is shown paper opening tab 58, 59 at edge 38. A film-to-film seal between PVC film 26 and EVA film 24 joins laminations 71, and 72 at the abutting faces 61, 62 of these laminations to the point of juncture with article 80. Opening tabs 58, 59 adhere to respective films 24, 26 through the agency of adhesive layers 120, 121. The film-to-film seal between inner laminations 24, 26 is modulated optionally, by frame-type heat seal, as required, to achieve the necessary bond strength commensurate with package durability and opening tension requirements.

FIG. 4 shows an illustrative alternative seal between inner layers 24, 26, which is bead 77 of hot melt adhesive. Although the preferred illustrated embodiments utilize releasable hermetic seals between inner layers 24, 26, non-releasable seal can be utilized around the entire article.

Beneath the PVC film 26 is EVA film 24, and aside from this difference, the lower half of the package 105 is a mirror image of the upper half. The use of saran and PVC films is suggested as a feasible combination for this package in addition to the other suggested combination, namely saran and EVA. However, still other film combinations are also possible. The following are examples of types of films of high oxygen permeability which could be substituted for use in the package of this invention, e.g., in conjunction with saran: polyethylene, ionomer, polyethylene copolymers, and rubber hydrochloride.

Cellulose derivatives, micro-porous plastics, and other films which are made chemically porous to oxygen by the copolymerization of glycol, hydroxy or vinyl pyrollidone groups may also be used. Generally speaking, any packaging film which provides an oxygen permeability, preferably between 300 and 700 cc., more preferably about 500 cc. of $O_2$ per 100 square inches per 24 hours, per 1 atmosphere per mil thickness at 75° F is contemplated for use as the inner film in thickness 1 to 3 mil in accordance with this invention. Generally speaking any film having more than 100 cc. $O_2$ permeability can be used, and no advantage or disadvantage has been found in using films having extremely high $O_2$ permeability, e.g., 1000 as compared to those having 500.

The following materials are contemplated for use as the peelable outer film, e.g., to be substituted for the saran outer skin previously illustrated; namely non-plasticized polyvinyl chloride film, phenoxy film, super high density polyethylene (0.96 density), and other plastic film or metal foil of the known types providing an oxygen permeation or transmission rate of from 0 to 10 cc., preferably below 1 cc. per 100 square inches, per 24 hours, per mil thickness per atmosphere at 75° F, in film having 1 to 3 mil thickness.

It is essential, however that the resulting lamination be characterized by sufficiently low film-to-film bond strength that the respective laminae, though structurally integral, are readily peelable or separable. Therefore it is contemplated, in accordance with this invention, that the film-to-film bond be provided either by direct film-to-film adhesion of appropriate strength, or by the use of suitable low strength adhesive systems, which, after removal of the outer oxygen barrier lamina do not interfere with the high-oxygen through-put character of the inner film package remaining around the fresh or fresh-frozen meat product.

A large number of specific combinations of polyvinylidene chloride-polyvinyl chloride film and ethylene-vinyl acetate copolymers of varying vinyl acetate levels are useful to provide peelable film-to-film bonding, for example, 85 percent polyvinylidene chloride-15 percent vinyl chloride in combination with an ethylene-vinyl acetate film having about 25 percent vinyl chloride.

By providing means for bonding the inner, high-oxygen through-put film to the outer, oxygen barrier film, said means providing sufficient bond strength to assure the maintenance of an integral lamination during package manufacturing operations and during wholesale distribution, and by providing integral tab means for readily peeling the outer lamina from the inner, the operation and handling at the retail outlet is greatly simplified. The invention also reduces the number of manufacturing steps and reduces the cost of the package manufacture and subsequent operation. Needless to say, webs 71, 72 can be manufactured in a separate web-making operation which ends in the rolling of webs 71, 72 for storage and/or shipment for eventual use in the package making operation illustrated in FIG. 2. If films 22, 24 and 26, 28 are of the type which are inherently peelably adherent to each other, the use of separating means during the rolling operation may be indicated in order to facilitate unrolling of the two ply lamination.

The method illustrated in the attached drawing is a preferred method, but the invention is not considered limited to the specific embodiment shown. For example, the illustrated embodiment shows two distinct separate webs being brought together around a body of meat. However, it is considered within the scope of the invention to enclose the body of meat by placing the body along one half of a web and folding the other half of the web over the body with the result that a hermetic seal is formed along three sides, the remaining side being the fold line of the original web. Likewise, it is contemplated that in such a fold-over operation, the folded over halves be hermetically joined, e.g., by heat seal, on all four sides with the fold-over lines being taken off in the trim operation. Thus, for example, inner package paper stock strips 58, 59 may be applied as a single strip along the mid-line of a relatively wide inner lamina. On folding of the lamination, the paper strip is also folded with the result that, in the subsequent trim operation, cutting away the fold-line portion of the lamination, and the fold line of the paper strip results in strips 58, 59 remaining.

Many other variations and modifications of the invention will be apparent to those skilled in the art. To further suggest kinds of alterations, modifications, and refinements which are within the invention, strips 40, 41 and strips 58, 59 are essentially means for maintaining opposed faces in separated condition, e.g., at approximately zero-bond. Therefore, it is considered entirely within the invention to utilize strip coating such as silicone, wax, or any other coating material which maintains the opposing faces in separated or virtually zero-bond condition.

However, advantages of the use of a paper strip for elements 40, 41 and 58, 59 include the fact that such strips help distribute peeling forces over a larger portion of the film during the initiation of the peel, and moreover the use of color-coded strips makes for more efficient removal of outer laminae 22, 28 from a large number of packages. For example when strips 40, 41 are color coded red, and strips 58, 59 are color coded green (although any combination of colors can be used) the retailer's task is greatly simplified, i.e., he need only perceive that he is peeling apart films which are separated by red strips, and need not check to determine whether the partially separated strips, i.e., tab portions at the edge of the package, are indeed the separation between the outermost layers or between the innermost layers.

Another variation which is believed clearly within the purview of this invention, is the positioning of tabs 40, 41 along one margin of the lamination, and placing of the other strips 58, 59 along an outer edge of the margin. In such an embodiment the tabs for removing the outermost lamination, e.g., color-coded red tabs, will be along one side of the package, and the tabs for gaining access to the contents of the package, e.g., color-coded green, will be positioned along an opposite edge. Such an embodiment virtually eliminates the risk of inadvertently breaking the hermetic seal and exposing the contents when the outer oxygen barrier layer is being removed. It also speeds up the "readying" process since the packages can be cartoned with all tabs of a given color arranged on one side of the carton.

It is also contemplated that individual plies or laminae of the perforated "waste" web 100 be peeled for separation of the individual lamina for recovery and reuse of the material. This, of course, is an advantage associated primarily with the use of naturally adhering film combinations which do not require the utilization of a separate adhesive means.

We claim:

1. In a package comprising a body of fresh or fresh-frozen meat enclosed between a first and second sheet of packaging material, said first and second sheets being adhered to each other in a margin encompassing said body to define a hermetic seal, at least a portion of the hermetic seal being releasable to provide access to said package, said package including means for separating said sheets at said releasable hermetic seal portion therebetween, the improvement in which:

each of said sheets consists essentially of a lamination having an inner first lamina and an outer second lamina;

each of said sheets including means for peelably bonding said first and second laminae to each other at least at that portion of said sheet which encloses said body with sufficient tenacity to maintain the structural integrity of said sheet and yet provide peelability;

said improvement including tab means for grasping a portion of the outer lamina for peelably separating the outer lamina from the inner lamina;

said outer lamina being relatively oxygen impermeable, said inner lamina being relatively oxygen permeable.

2. In a package comprising a body of fresh or fresh-frozen meat enclosed between a first and second sheet of packaging material, said first and second sheets being adhered to each other in a margin encompassing said body to define a hermetic seal, at least a portion of which is releasable to provide access to the package, the improvement in which:

each of said sheets consists essentially of a lamination having an inner first lamina and an outer second lamina;

each of said sheets including means for peelably bonding said first and second laminae to each other at least at that portion of said sheet which encloses said body with sufficient tenacity to maintain the structural integrity of said sheet and yet provide peelability;

said improvement including tab means for grasping a portion of the outer lamina for peelably separating the outer lamina from the inner lamina;

said outer lamina having an oxygen permeability between 0 to 4 cubic centimeters of oxygen per 100 square inches, per 24 hour per mil thickness per atmosphere difference at 75° F, said inner lamina having an oxygen permeability greater than 100 cubic centimeters of $O_2$ per 100 square inches per mil thickness per 24 hours per 1 atmosphere at 75° F.

3. In a package comprising a body of fresh or fresh-frozen meat enclosed between first and second sheets of packaging material, said first and second sheets being adhered to each other to define a hermetic seal, the improvement in which each of said sheets consists essentially of a lamination, having outer and inner laminae peelably bonded to each other at that portion of the sheet which encloses the body, said outer lamina having an oxygen transmission rate between 0 and 10 cubic centimeters per 100 square inches per 24 hours per mil thickness at 75° F and 760 mm. Hg, and said inner lamina having an oxygen permeability about 500 cubic centimeters of $O_2$ per 100 square inches per 24 hours per 1 atmosphere per mil thickness at 75° F; said improvement including tab means for initiating peeling of the outer lamina from said inner lamina.

4. In a package comprising a body of fresh or fresh-frozen meat enclosed between a first and second sheet of packaging material, said first and second sheets being adhered to each other in a margin encompassing said body to define a hermetic seal, the improvement in which each of said sheets consists essentially of a lamination having an inner first lamina and an outer second lamina, said inner first lamina being a member selected from the group consisting of ethylene-vinyl acetate copolymer, and polyvinyl chloride, said outer second lamina consisting of a film of saran, said inner first lamina and outer second lamina being peelably bonded to each other by inherent adhesion therebetween, said improvement including tab means for grasping a portion of the outer lamina for peelably separating the outer lamina from the inner lamina.

5. In a package comprising a body of fresh or fresh-frozen meat enclosed between a first and second sheet of packaging material, said first and second sheets being adhered to each other in a margin encompassing said body to define a hermetic seal, the improvement in which each of said sheets consists essentially of a two-ply lamination having an inner first ply and an outer second ply, and means for peelably bonding said first and second plies to each other at least at that portion of said sheet which encloses said body with sufficient tenacity to maintain the structural integrity of said sheet and yet provide peelability;

said improvement including tab means for grasping a portion of the outer ply for peelably separating the outer ply from the inner ply, said tab means comprising a relatively narrow paper strip adhering to at least one of said plies and being positioned between said plies, said tab means including means for repelling adhesion between said paper strip, the opposing portion of the other ply.

6. In a package comprising a body of fresh or fresh-frozen meat enclosed between a first and second sheet of packaging material, said first and second sheets being adhered to each other in a margin encompassing said body to define a hermetic seal, the improvement in which each of said sheets consists essentially of a lamination of an inner first lamina and an outer second lamina;

each of said sheets including means for peelably bonding said first and second laminae to each other at least at that portion of said sheets which encloses said body with sufficient tenacity to maintain the structural integrity of said sheet and yet provide peelability for separating said outer second lamina from said inner first lamina;

said improvement including first tab means for grasping a portion of the outer lamina for peelably separating the outer lamina from the inner lamina;

said improvement including second tab means for grasping a portion of the inner lamina for peelably separating the inner laminae from each other to provide accessibility to said body.

7. In the improvement of claim 6 in which said first tab means are positioned along one side of said package, and in which said second tab means is positioned along a second side of said package, and indicia on said first and second tab means for indicating to a user of the package which of the respective plies are separated by the respective tab means.

8. In a method of packaging a body of fresh or fresh-frozen meat between a pair of film laminations comprising the steps of forming said pair of film laminations by bonding respective inner lamina to respective outer lamina to form first and second film laminations, inserting a product between said first and second film laminations, enclosing the body by drawing at least one of said laminations around the article, and bonding said first and second laminations to each other to form a hermetic seal completely enclosing said body between said first and second laminations, the improvement in which:

said bonding of said inner and outer lamina consists of forming a peelable bond therebetween;

said outer lamina being relatively oxygen impermeable, said inner lamina being relatively oxygen permeable;

said improvement including the step of continuously feeding means for separating said outer and inner laminae along a zone which is spaced apart from that portion of the resulting lamination which encloses said body, said zone being located along a portion of said lamination in which a portion of said hermetic seal is formed, said zone including a portion of the lamination which becomes an edge of the finished package.

9. In a method of packaging a body of fresh or fresh-frozen meat between a pair of film laminations comprising the steps of inserting a product between a first and second film lamination, enclosing the body by drawing at least one of said laminations around the article, and bonding said first and second laminae to each other to form a hermetic seal completely enclosing said body between said first and second laminations, the improvement in which:

each of said laminations is made by the steps including extruding an outer lamina film having an oxygen through-put between 0 and 4 cubic centimeters $O_2$ per 100 square inches per 24 hours per mil thickness per atmosphere at 75° F, extruding an inner lamina film having oxygen permeability above 100 cubic centimeters of $O_2$ per 100 square inches per 24 hours per 1 atmosphere at 75° F and peelably bonding said outer and inner laminae films to each other to form said lamination;

said improvement including the step continuously feeding means for separating said outer and inner laminae along a zone which is spaced apart from that portion of the resulting lamination which encloses said piece, said zone being located along a portion of said lamination in which a portion of said hermetic seal is formed, said zone including a portion of the lamination which becomes an edge of the finished package.

* * * * *